United States Patent [19]

Gatewood

[11] 4,397,559

[45] Aug. 9, 1983

[54] APPARATUS FOR PROCESSING ELECTROMAGNETIC RADIATION AND METHOD

[75] Inventor: George D. Gatewood, Pittsburgh, Pa.

[73] Assignee: University of Pittsburgh, Pittsburgh, Pa.

[21] Appl. No.: 236,023

[22] Filed: Feb. 19, 1981

[51] Int. Cl.³ ............... G01B 11/14; G01B 11/26; G01J 1/04
[52] U.S. Cl. ............... 356/404; 250/203 R; 356/141
[58] Field of Search ............... 356/373–375, 356/141, 152, 175; 250/203 R, 237 G, 561

[56] References Cited

U.S. PATENT DOCUMENTS

| | | | |
|---|---|---|---|
| 3,072,794 | 1/1963 | Ostergren | 250/203 |
| 3,219,828 | 11/1965 | Foster | 250/203 R |
| 3,324,296 | 6/1967 | Powell | 250/203 R |
| 3,329,818 | 7/1967 | Woehl | 250/203 R |
| 3,533,702 | 10/1970 | Hock et al. | 356/167 |
| 3,598,493 | 8/1971 | Fisher | 356/152 |
| 3,659,950 | 5/1972 | Troll et al. | 356/199 |
| 3,683,195 | 8/1972 | Johannsmeier et al. | 250/219 |
| 3,781,110 | 12/1973 | Leitz et al. | 356/4 |
| 3,856,400 | 12/1974 | Hartmann et al. | 356/28 |
| 3,856,401 | 12/1974 | Heitmann et al. | 356/28 |
| 3,900,260 | 8/1975 | Wendt | 356/5 |
| 3,914,052 | 10/1975 | Wiklund | 356/5 |
| 3,917,409 | 11/1975 | Kaestner | 356/125 |
| 3,951,550 | 4/1976 | Slick | 356/141 |
| 3,953,133 | 4/1976 | Jacoby | 356/152 |
| 3,967,899 | 7/1976 | O'Meara | 356/5 |
| 3,972,021 | 7/1976 | Leitz et al. | 340/38 P |
| 4,048,492 | 9/1977 | Hartmann | 250/201 |
| 4,093,154 | 6/1978 | McLean | 244/316 |
| 4,229,103 | 10/1980 | Hipp | 356/152 |

FOREIGN PATENT DOCUMENTS 2002510 2/1979 United Kingdom ............... 356/373

OTHER PUBLICATIONS

Gatewood et al., "On the Astrometric Detection of Neighboring Planetary Systems II", Icarus, vol. 41, #2, 2/80, pp. 205–231.
Gatewood et al., "The Astrometric Search for Neighboring Planetary Systems", Strategies for the Search for Life in the Universe", M. D. Papagiannis (Ed.), 1980, p. 111–154.
Farrell, E. J. "Information Content of Photoelectric Star Images", Jr. Optical Soc. Am. 5/66, pp. 578–587.

Primary Examiner—William H. Punter
Attorney, Agent, or Firm—Buell, Blenko, Ziesenheim & Beck

[57] ABSTRACT

Measuring apparatus including a ruled member having alternate transparent and opaque zones. An optical coupler connecting the ruled member with electromagnetic radiation-conversion apparatus. The conversion apparatus may include a photomultiplier and a discriminator. Radiation impinging on the ruled member will, in part, be converted to electrical pulses which correspond to the intensity of the radiation.

A method of processing electromagnetic radiation includes providing a member having alternating dark and light zones, establishing movement of the member through the beam of electromagnetic radiation with the dark zones interrupting passage of radiation through the rule, providing an optical coupler to connect a portion of the radiation with a conversion station where the radiation portion is converted into an electrical pulse which is related to the intensity of the radiation received at the conversion station. The electrical pulses may be counted and the digitized signals stored or permanently recorded to produce positional information.

54 Claims, 13 Drawing Figures 4,397,559

APPARATUS FOR PROCESSING ELECTROMAGNETIC RADIATION AND METHOD

The invention described herein was made in the performance of work under NASA Contract No. NSG-2711 and is subject to the provisions of Section 305 of the National Aeronautics and Space Act of 1958 (72 Stat. 435; 42 U.S.C. 2457).

BACKGROUND OF THE INVENTION

1. Field of the Invention

The present invention relates to apparatus for converting information contained in electromagnetic radiation into a related electrical signal and the method associated therewith.

2. Description of the Prior Art

In many environments it has been desirable to record the information carried by electromagnetic radiation such as light, for example, to obtain a permanent record which corresponds to the information contained within the radiation.

In astronomy, for example, it has been known for years to employ a telescope in order to provide an enlarged image of a star field, planet or other object which is to be subjected to scrutiny. In addition to observing the objects through the telescope, it has been known to record images on photographic plates which are properly positioned with respect to the optical system of the telescope. By providing a series of photographic exposures, one is able to monitor movement of a star or other object over a period of time. Such an approach requires a prolonged series of observations, made over many weeks or years using a large volume of photographic plates. In this fashion, information regarding the path of movement of a star, the presence of an adjacent star or planet and the influence thereof on the path of movement of a star and other information have been obtained.

One of the problems with this conventional approach is the fact that it requires a prolonged period of time and the detailed information which is desired cannot often be obtained with great precision in view of the limitations of the photographic process.

There remains, therefore, a specific need for improved apparatus and methods for converting information contained within an electromagnetic radiation beam into a precise, permanent record.

SUMMARY OF THE INVENTION

The present invention has solved the above-described problems by providing rapid and efficient means for converting electromagnetic radiation information into high-precision, permanent records, including digitized output capability. In the system of the present invention, ruling means which are adapted to be positioned in a beam of radiation have a series of alternating transparent and opaque zones. The ruling means is placed within the beam and is subjected to substantially linear movement thereby serving to break up the beam intermittently. In one embodiment, light passing through the ruling means impinges upon photomultiplier means which converts the light into a responsive electrical signal which is a function of the intensity of the light. The electrical signal is then passed through discriminator means which permits electrical signals within a certain range of amplitudes to pass. The signals passing may be amplified. The signals passing then go to a counter means. The counter means may cooperate with signal-receiving means, such as a computer, which is adapted to periodically receive a count from the counter means and store the same or make a permanent record of the same, with or without intermediate processing.

Optical coupling means will generally be provided between the ruling means and the photomultiplier means for efficient transfer of light therebetween.

In one embodiment of the invention, a number of objects may be observed simultaneously with independent channel means being provided for each separate object being observed. In this embodiment separate photomultiplier means, discriminator means, amplifier means, and counter means may be provided for each channel.

It is an object of the present invention to provide apparatus for converting information contained within a beam of electromagnetic radiation into a high-accuracy, permanent record.

It is another object of the present invention to provide such apparatus and method for use in connection with a telescope in monitoring position and movement of stars, planets and other objects in space.

It is a further object of the present invention to provide such a method and apparatus which is adapted to measure simultaneously position and movement of several objects.

It is another object of the present invention to provide such a system which resists sensible systematic errors, provides for reduced random errors and provides concurrent records of a sufficient number of reference points or stars to allow optimum usage of the optical system.

It is another object of the present invention to provide such a system which provides results of higher spatial resolution and quantum efficiency.

It is another object of the present invention to promote such a system which is adapted to provide digitized output.

It is yet another object of the present invention to provide such a system which is economical to create and employ.

These and other objects of the invention will be more fully understood from the following description of the invention on references to the illustrations appended hereto.

DESCRIPTION OF THE PREFERRED EMBODIMENTS

As used herein, the term "electromagnetic radiation" shall include but not be limited to light waves, radio waves, x-rays, gamma rays, infrared radiation and microwave radiation.

Figure 1:
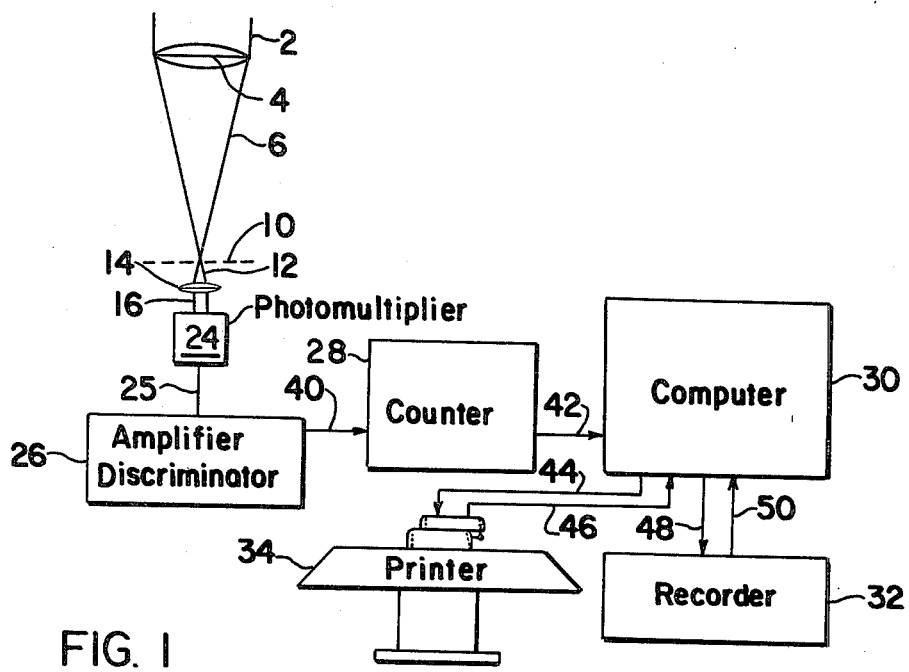
FIG. 1 is a schematic illustration of one embodiment of the apparatus of the present invention.

Referring now more specifically to FIG. 1, a form of one-channel apparatus with the beam of light being seen through a telescope will be considered. The telescope which may be any suitable type, in the form used in reducing to practice n embodiment of the invention is a photographic refractor telescope. After focusing the telescope on one or more reference or target stars or other light emitting or light reflecting objects, a beam of light 2 will impinge upon the telescope's objective lens 4 with the output beam 6 focusing on ruling 10 which is preferably disposed in the focal plane of the telescope.

As will be described in greater detail hereinafter, the ruling 10 which serves to modulate the radiation has a series of transparent first zones disposed in alternating position with a series of opaque second zones. The ruling 10 is subjected to relative linear movement with respect to light beam 6 thereby serving to alternately permit passage of light through the transparent zones and resist passage of light through the opaque zones. The light beam 12 emerging from the ruling 10 is delivered to photomultiplier means 24 by optical coupling means, which in the form shown is a collimating lens 14 (such as a Fabry lens) which serves to convert diverging light beam 12 into light beam 16. A suitable light-proof shroud or diaphragm (not shown) will be disposed around the optical coupling means so as to resist undesired light leakage into the photomultiplier tube.

Within the photomultiplier tube 24 each photon of light which impinges causes the release of an electrical pulse. The pulse rate is a function of the intensity of the impinging light. Electrical wire 25 connects the photomultiplier means 24 with amplifier-discriminator means 26. Signals emerging from the photomultiplier 24 are transported by electrical wire 25 to the amplifier-discriminator 26 wherein pulses of a predetermined strength corresponding to a photon event are permitted to pass therethrough and are amplified. In instances where the signal-to-noise ratio is sufficiently great, and in other desired instances, the amplifier may be unnecessary. Other signals are prevented from passing therethrough. Electrical lead 40 carries the output from amplifier-discriminator 26 to a pulse counter 28 wherein the number of electrical pulses emitted by the amplifier-discriminator 26 is counted. Periodically the count on a register in counter 28 is transferred to computer 30, which is preferably a digital computer, by means of lead 42. The count is stored in the computer and may be permanently recorded or displayed by any desired means. For example, the output of computer 30 may be delivered to printer 34 for making a permanent hard-copy record. Printer 34 is connected to the computer 30 by leads 44, 46. Similarly, a magnetic tape or disc recorder or reader-punch (indicated generally at 32) may be secured to the computer 30 by leads 48, 50. If desired, meters for direct readout may be employed.

Figure 1A:
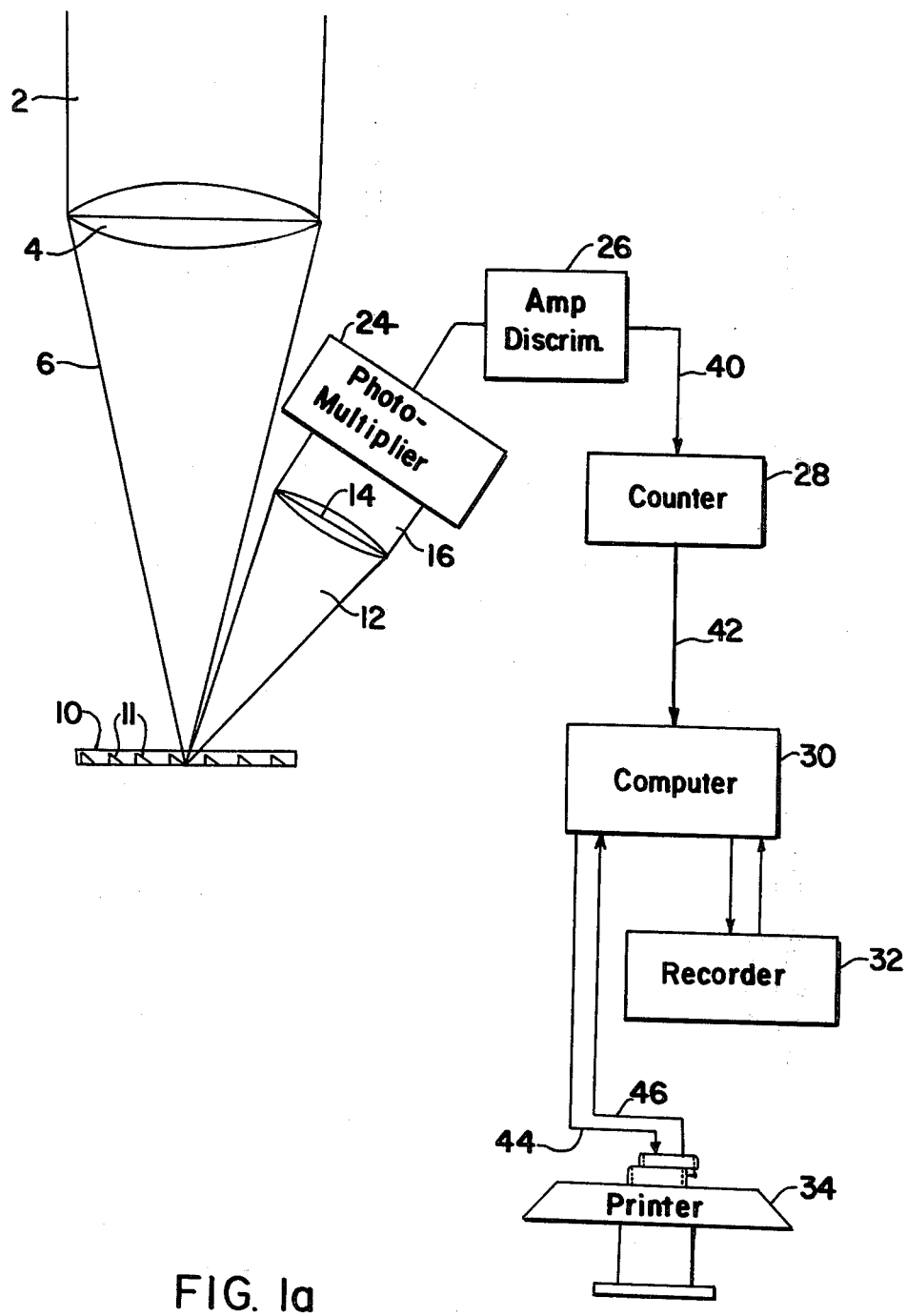
FIG. 1(a) is a schematic illustration of another embodiment of the apparatus of the present invention.

FIG. 1(a) shows a modified form of the invention which rather than using light passing through the ruling 10 provides for light to be reflected off of surfaces 11 of the ruling through lens 14 onto photomultiplier 24 with subsequent processing occurring as in the FIG. 1 embodiment.

Figure 2:
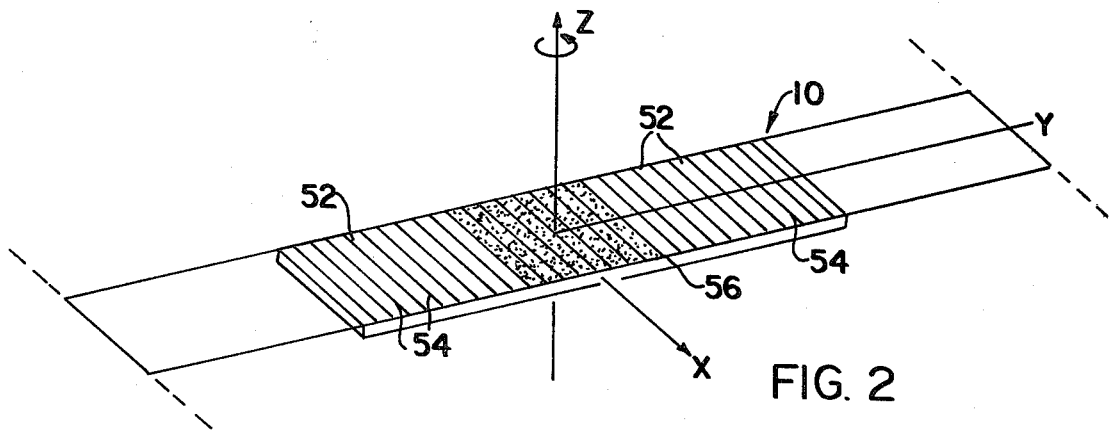
FIG. 2 is a schematic illustration of a form of ruling means adapted for use in the present invention.

Referring now more specifically to FIG. 2, a further description of the ruling 10 and its operation will be considered. The ruling, in the form shown is generally rectangular and has a series of first transverse zones 52 which are transparent and a series of alternating second zones 54 which are opaque. In one form the width of zones 52 are all substantially equal to each other, the width of zones 54 are all substantially equal to each other and the width of zones 52 and 54 are also substantially equal to each other. However, the ruling pattern may take a wide variety of forms depending upon the particular application. The width of zones in the context of FIG. 2 would be considered measured along the y axis or longitudinally of the ruling. The central zone which for purposes of illustration, has been shown to be dotted and has been designated by the reference numeral 56 will be the prime zone through which light passes through the ruling 10. In use, the ruling will be moved longitudinally in a first linear direction along the y axis and will thereby intermittently permit passage of portions of light beam 6 therethrough and resist passage of portions of light beam 6 therethrough. After the ruling has been translated a predetermined distance in the y direction it is translated along the same y axis in the reverse direction with continuation of data collection.

While various means may be employed to translate the ruling 10, one preferred means is to mount the ruling with protectively overlying and underlying sheets of transparent material such as glass within a generally channel-shaped metal frame with a threaded shaft projecting from one end of the frame and a support shaft projecting from the other. A suitable bearing support is provided for the latter shaft portion and a screw motor is employed to provide substantially constant velocity for the moving ruling. Operation of the screw motor may be controlled by a microprocessor, if desired.

By way of an example, a Ronchi ruling having a length of about 12 inches and a width of about 5 inches with a line density of about four line parts per mm, i.e., four transparent zones 52 and four opaque zones 56 within a millimeter measured along the y axis (FIG. 2) may be employed. The extent of linear or translational travel of the ruling 10 in use will be about 7 inches. The 7 inches of travel will take approximately 12 minutes.

One preferred means of creating the ruled portion is by depositing a metal alloy on a quartz substrate and subsequently using an interferometer spaced cutting tool to remove metal from what will become transparent zones 52.

In one embodiment of the invention after completing the translational movement along the y axis in both directions, the ruling 10 and the drive means for the ruling (not shown) are subjected to 90 degrees of rotation about the z axis. After rotation, linear translational movement of the ruling 10 along the x axis in both directions is effected in order to collect data along this axis. In another embodiment, after translational movement along the y axis in one direction, the ruling is rotated 90 degrees about the z axis. The ruling 10 is then translated in one direction along the x axis and then rotated 90 degrees to the y axis (continuing to rotate in the same direction about the z axis). The ruling 10 is then translated in the reverse direction along the y axis from its initial movement therealong. After that further 90 degree rotation about the z axis (in the same direction of rotation) returns the ruling to the x axis where it is subjected to translational movement therealong in the reverse direction from the initial movement on the x axis.

Figure 3:
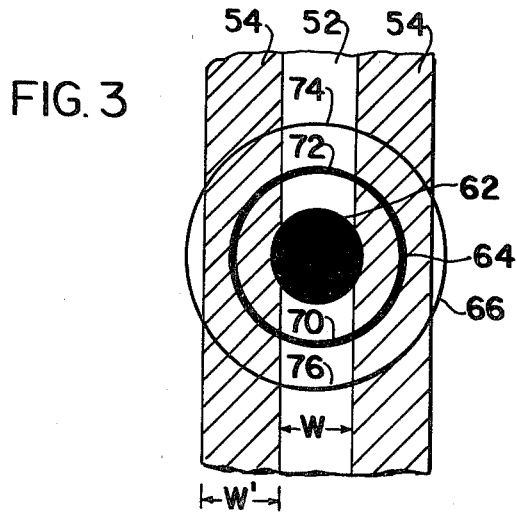
FIG. 3 is a fragmentary schematic view of a portion of a ruling with a radiation beam impinging thereon.

Referring now to FIG. 3, there is shown a sector of the ruling 10 consisting of two opaque zones 54 and a transparent zone 52. A light beam which may for purposes of discussion be considered to be a star on which the telescope has been focused has a central, generally circular light beam 62, (the Airy disk) a concentric first diffraction ring of light 64 and an outer concentric diffraction ring of light 66 which is of lesser thickness than ring 64. The vast majority (generally over 85%) of the energy of the image is carried in disk 62 and most of the remainder is carried in ring 64. In the form shown in FIG. 3, the star is substantially centered on transparent zone 52. Except for the extreme leading and extreme trailing portions of light beam or disc 62 virtually all of the beam passes through transparent sector 52. Arcs 70, 72 of ring 64 pass through transparent zone 52 as do arcs 74, 76 of ring 66. Adjacent portions of rings 64, 66 impinge upon opaque portions 54. Thus, substantially all of the information carried by the light is subject to measurement.

Figure 4:
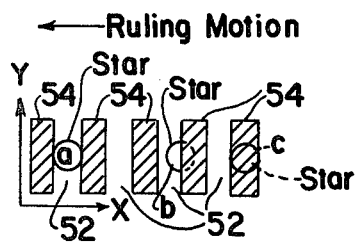
FIG. 4 illustrates schematically a portion of the ruling with three light sources in different relative positions with respect thereto.
Figure 5:
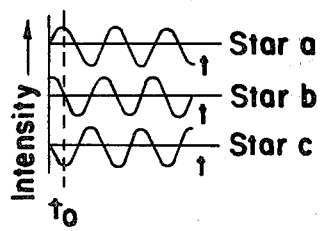
FIG. 5 is a plot of time versus intensity of the three light sources shown in FIG. 4.

Referring now to FIGS. 4 and 5, further details of the system will now be considered in connection with the monitoring of several light beams simultaneously. More specifically, as is shown in FIG. 4, the ruling is shown with alternating transparent zones 52 and opaque zones 54 with the x and y axes being illustrated as well as the arrow indicating movement of the ruling along the x axis in a generally negative direction. For convenience of reference, the circled objects designated "a", "b" and "c" will be considered as relating to the positions of three different stars at a particular instant in time. As will be seen in FIG. 4, the star "a" is generally centered within a transparent zone 52, a star "b" is generally half exposed through a transparent zone 52 and is half obscured by an opaque zone 54. Star "c" is substantially completely blocked by an opaque zone 54.

FIG. 5 is a plot of light intensity (as measured by the corresponding electrical signals) versus time for the three stars shown in FIG. 4. The time $t_0$ indicates the instant in time shown in FIG. 4.

As is seen at time $t_0$, the fully exposed star "a" has a peak of light intensity in terms of the brightness of the light passing through the ruling. Star "b" is at the zero point of intensity with half exposure corresponding to an intermediate position between the maximum and minimum points in the generally sine wave profile. Finally, star "c" which is substantially totally obscured by an opaque zone 54 has a minimum at time $t_0$. As the maximum and minimum amplitudes of the sine waves for respective stars "a", "b", "c" are substantially equal, the stars would be of equal magnitude. The difference in relative phases of the curves illustrated in FIG. 6 relates directly to a difference in relative positions of the stars "a", "b", "c" as observed through the reference ruling.

Referring once again to FIG. 3, it is preferred that the width W of transparent zone 52 be substantially equal to the width W' of opaque zone 54, although for some uses width W may be made greater or less than width W'.

Figure 6:
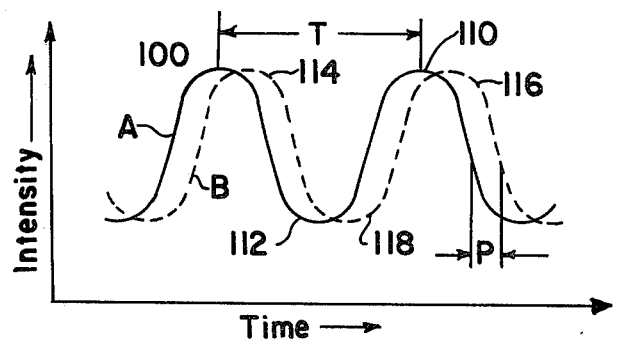
FIG. 6 is a plot of time versus intensity of two different light sources which are out of phase.

As is shown in FIG. 6, a first source of electromagnetic radiation has a time versus intensity plot indicated by the letter "A" and a second source of electromagnetic radiation has a time versus intensity plot indicated by dotted curve "B". This histogram type representation, which may be generated by the computer, plots the number of electrical pulses (corresponding to radiation intensity) received within a unit of time. As was shown in FIG. 3, the diameter of disks 62 is greater than the width W of the transparent zone 52. As a result, some radiation will always be passing through the ruling. As a result, even the minimum points 112, 118 on the respective curves A, B are vertically displaced from the point of zero intensity. Curve A has a maximum intensity at points 100 and 110, while curve B has maximum intensity at points 114, 116. FIG. 6 represents the output from two separate photomultiplier-discriminator-amplifier-counter means subsystems, each of which is receiving radiation from a separate source. Assuming that the distance T between peaks 100, 110 measured along the time axis is approximately one twentieth of a second, the distance measured along the time axis between peak 100 and minimum 112 on curve A will be approximately one arc second. In the form shown, the same is true for Curve B. Assuming that the separation between the radiation sources is known to the nearest number of line spacing, the exact separation of these sources may be obtained by adding the phase difference P between the two curves A, B. In the example shown, P equals 0.25 arc second. As only the phase difference need be determined to obtain the precise relative positioning of the two radiation sources, the system is insensitive to most of the factors which would have been of consequence in absolute photometry. In this fashion, the precise positional information with regard to a target source as related to one or more reference sources may be determined rapidly and efficiently.

Figure 7:
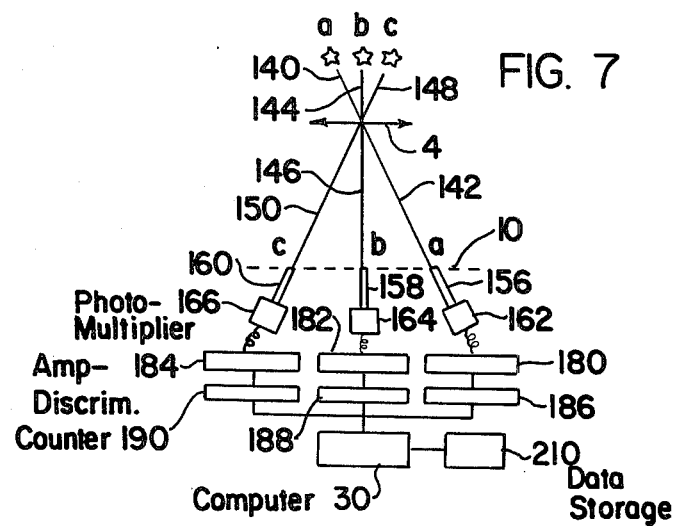
FIG. 7 is an illustration of a multichannel embodiment of the present invention.

Referring now to FIG. 7, a multichannel system will be considered. The light originating with stars "a", "b", "c" passes in the form of light beams 140, 144, 148 respectively, to telescope objective lens 4. The light from these stars "a", "b", "c" emerges from lens 4 as beams 142, 146, 150, respectively, and impinges upon ruling 10. While for simplicity of illustration the light impinging upon ruling 10 has been shown generally as a straight line, it will be appreciated that these beams are of generally conical shape and the ruling 10 is positioned substantially within the focal plane of the telescope's objective lens. It will be appreciated, that in this embodiment, as distinguished from the embodiment shown in FIG. 1, multi-channel means are provided for independently processing each of the light beams 140, 144, 148 whereas the corresponding illustration in FIG. 1 contained only a single light beam in which case positions are determined relative to the telescope's pointing as distinguished from other reference objects.

The portion of the light beam 140–142 passing through ruling 10 will be transmitted by optical coupling means, which in the form shown is fiber optic means 156 to photomultiplier tube 162. In photomultiplier tube 162 the light which is received is converted to corresponding electrical pulses, the frequency of which is a function of the intensity of the light received. Similarly, photomultiplier tube 164 receives the portion of light beam 144-146 passing through ruling 10 by means of fiber optic means 158. Photomultiplier tube 166 receives the portion of the light beam 148-150 passing through ruling 10 through fiber optic means 160. It will be appreciated, that the positional information of stars "a", "b", "c" will at this point have been converted from light-contained information to electrical pulses. The electrical signals emerging from the photomultiplier tubes 162, 164, 166 are introduced into the amplifier-discriminators 180, 182, 184, respectively. The discriminator portion of the unit, which, of course, may be provided separately from the amplifier portion, serves to provide a filtering action whereby only electrical pulses above a threshold voltage and, if desired, below a second voltage are permitted to pass through. For example, the discriminator may be so provided as to permit an electrical pulse to emerge therefrom responsive to a pulse of approximately one million electrons. If desired, in high luminosity (light intensity) applications, the pulse counting mode could be replaced by an analog (voltage or current) readout of the electrical signal emerging from the photomultiplier tube. In such case, if a digital computer is being employed, the pulse counters could be replaced by analog-to-digital converters. Signals which are to be permitted to emerge from the discriminator are then amplified. The electrical signals emerging from the amplifier discriminators 180, 182, 184 are introduced into pulse counters 186, 188, 190, respectively, wherein each pulse received is counted. Each of the counters 186, 188, 190 contains a register which stores the count for a predetermined period.

Computer means 30, which preferably takes the form of a digital computer is connected to the pulse counters 186, 188, 190 and periodically clears the registers by receiving the count and an indication of its source. This information is preferably numbered sequentially and may be stored in any desired manner. If desired, the time when the data was collected may be recorded. The computer, for example, may add to the time when the process was initiated each period of subsequent integration time as the integration period ends. The computer clock initiates the action which causes the computer to clear the pulse counter registers at a particular time. The information received by the computer may be stored in the computer with or without initial processing to provide for data in the proper form or desired form. Also, the information may be transferred to a data storage unit 210 which may take the form of a memory core, a means for providing a tangible record such as a printer, a monitor for visual display or a magnetic tape or disc, for example. In general, a single clock associated with the computer will provide the triggering means for initiating withdrawal of the count from the pulse counters 186, 188, 190 to the computers.

It will be appreciated that in this fashion, through the use of the linear metric ruling 10, the relative positions of the stars "a", "b", "c" can be determined with great speed and precision.

Figure 8:
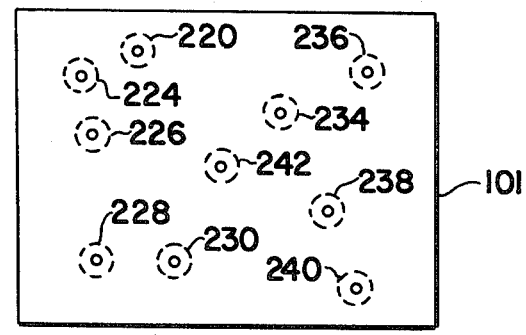
FIG. 8 is a top plan view of a platen and associated markings representative of reference and target light sources.
Figure 9:
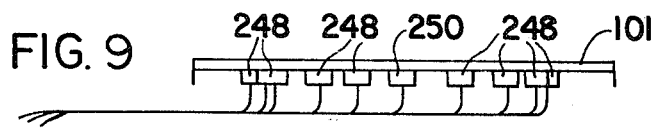
FIG. 9 is a front elevational view of FIG. 8.

Referring now to FIGS. 8 and 9, a specific means of using the present invention in the context of determining star positioning will now be considered. In these views, a rigid, opaque metal platen 101 prepared to measure a specific region or field of the sky is employed. A map of a series of openings positioned to correspond to individual reference stars 220, 224, 226, 228, 230, 234, 236, 238, 240 is provided. Associated individual detectors 248 are each positioned so as to receive light from one of the above-identified stars. These stars are ones with respect to which the relative positions are known to the nearest whole number of line spacings of the ruling 10. These photometers 248 while shown schematically, may be optically coupled to the overlying ruling (not shown) through platen 101 as by fiber optic means, for example, and may consist of photomultiplier tubes. Also shown in FIG. 9 is an opening corresponding to a target star 242 with respect to which information is to be gathered regarding its relative position. An associated detector 250 is provided in the position of star 242. The array of wires leading from the detectors 248, 250 may lead to electrical processing means of the type described above. It will be appreciated, that in this fashion, a precise determination of the position of star 242 with respect to each of the reference stars may be made. While for convenience of illustration, a group of eight reference stars has been illustrated, it will be appreciated that meaningful positioning information can be obtained with the use of only two reference stars or with any greater number or less than the illustrated eight stars.

Figure 10:
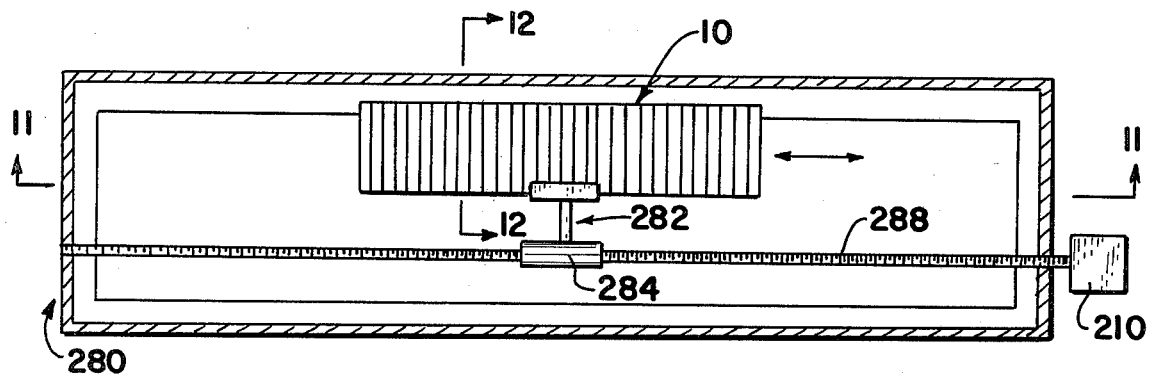
FIG. 10 is a top plan view of a form of ruling movement apparatus of the present invention.
Figure 11:
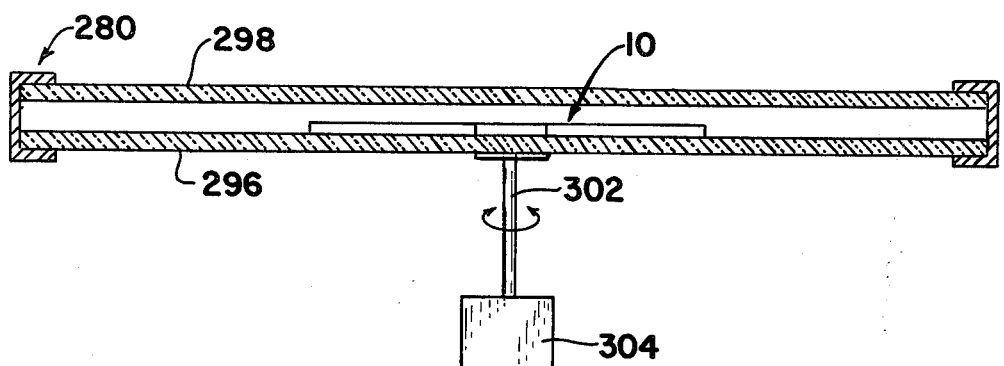
FIG. 11 is a cross-sectional view through 11—11 of FIG. 10 and the lower portion showing the rotation apparatus.
Figure 12:
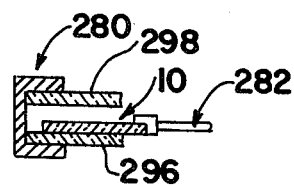
FIG. 12 is a cross-sectional illustration of a portion of the apparatus of FIG. 10 taken through 12—12.

Referring more specifically to FIGS. 10 through 12, additional details of a preferred means for moving the ruling 10 will be considered. As has been described hereinbefore, the ruling will be subjected to movement in a generally linear path through reciprocating movement. As is shown in FIGS. 10 through 12, the ruling 10 is contained within a generally channel shaped member 280 with underlying sheet member 296 which may be conveniently made of glass and a similar overlying sheet member 298. Connector member 282 is fixedly secured to the ruling 10 and terminates in a tubular portion 284 which is mounted on externally threaded shaft 288. Energizing of motor 210 causes responsive rotation of the shaft with longitudinal movement of the tubular portion 284 along the shaft in a direction corresponding to the direction of rotation of the shaft. It will be appreciated by reversing the direction of rotation of the shaft the ruling will be caused to move in the opposite direction. With respect to rotation of the unit to effect reciprocation of the ruling in a direction substantially perpendicular to the first direction of movement, shaft 302 may be fixedly secured to the housing for the ruling 10 and rotated in the desired direction to the desired extent by motor 304.

While prior art photography systems would be able to use only one out of every three hundred photons received, the present system has substantially increased quantum efficiency and may use about one out of every five photons received.

While for purposes of simplicity of illustration, a specific form of preferred means of converting the electromagnetic radiation contained information into electrical pulses which are ultimately processed and/or stored have been disclosed, it will be appreciated that other means may be employed. For example, such information may, in certain uses, be advantageously converted to electrical signals by other means such as self-scanning arrays of photodiodes. Such a system could image an entire field of stars or other objects onto the sensitive portion of one or more detectors. The electrical output of such detectors could be provided in analog or digital form and depending upon tolerable noise or interference (unwanted signal) levels may in some instances be employed without the discriminator means. Similarly, depending upon the nature of the electrical signal, the amplifier may, in certain instances, be eliminated.

While for purposes of simplicity of disclosure specific embodiments centering around monitoring of stars, planets or other light-emitting or reflecting objects in space from a land-based source has been disclosed, it will be appreciated that the invention is not so limited. The invention may well be used in devices located in the air within or beyond the earth's atmosphere, for example. A space-mounted telescope may be provided with the apparatus of the present invention and adapted to use radio means to receive signals from earth and/or transmit signals back to a receiving station on earth.

It will also be appreciated that the invention may be employed to determine in a passive fashion the position of man-made objects in space such as satellites, planes, space ships, rockets, space stations and the like. The system of the present invention may also be used for real time triangulation. For example, two distant optical systems could be used for the passive observation and distance determination of space borne objects within the solar system. The two sets of measurements may be processed by one computer.

While specific emphasis has been placed on the use of the invention in combination with a telescope and in connection with objects in the air within or beyond the earth's atmosphere, the invention is not so limited and numerous commercial, university and industrial uses will be readily apparent. For example, the device may be used in any situation wherein an electromagnetic radiation beam contains information which is adapted to be processed in a rapid and accurate fashion to determine certain positional or dimensional information with respect to any object.

For example, where it is necessary or desirable to determine the position of an opening in an object, passing light from a suitable source through the opening which would provide a source of light and subsequently having the light impinge on a movable ruling with subsequent processing in accordance with this invention may be employed.

While the transparent portion of the ruling has been disclosed specifically herein to be a solid transparent section, openings in the ruling may be employed in lieu thereof.

While for simplicity and clarity of disclosure herein, specific reference has been made to the radiation which is converted to electrical pulses passing through the ruling to the detectors, other means could be employed. For example, the opaque zones could be reflective and the detectors so positioned as to receive the radiation reflected by said zones as distinguished from radiation passing through said ruling.

Whereas particular embodiments of the invention have been described above for purposes of illustration, it will be appreciated by those skilled in the art that numerous variations of the details may be made without departing from the invention as described in the appended claims.

I claim:

1. Electromagnetic radiation measuring apparatus comprising
    ruling means adapted to be positioned in a beam of said radiation and having a series of substantially transparent first zones, a series of substantially opaque second zones with at least some of said first or second zones disposed in alternating position with respect to the other said zones,
    optical coupling means for receiving radiation from said ruling means,
    photomultiplier means for receiving radiation from said optical coupling means and emitting responsive electrical pulses,
    discriminator means for permitting electrical pulses of predetermined amplitude corresponding to photon events to pass therethrough, and
    counter means for counting pulses passing through said discriminator means and emitting a count which is a function of the intensity of the radiation received by said optical coupling means.

2. The measuring apparatus of claim 1 including said optical coupling means having lens means.

3. The measuring apparatus of claim 1 including
    said optical coupling means including fiber optic means.

4. The measuring apparatus of claim 1 including
    amplifier means electrically interposed between said discriminator means and said counter means.

5. The measuring apparatus of claim 4 including
    said optical coupling means adapted to receive radiation passing through said transparent first zones of said ruling.

6. The measuring apparatus of claim 4 including
    said optical coupling means adapted to receive radiation reflected by said opaque second zones of said ruling.

7. The measuring apparatus of claim 1 including
    drive means for moving said ruling means in a generally linear path, whereby said radiation will be modulated by said ruling.

8. The measuring apparatus of claim 7 including
    said drive means having means for rotating said ruling.

9. The measuring apparatus of claim 8 including
    said drive means having means for moving said ruling means in two translational paths disposed generally perpendicularly with respect to each other, and
    the axis of rotation of said ruling means being disposed generally perpendicular with respect to said two paths.

10. The measuring apparatus of claim 7 including
    said drive means having means for reciprocating said ruling means within said generally linear path.

11. The measuring apparatus of claim 7 wherein
    said photomultiplier means includes a number of photomultiplier tubes.

12. The measuring apparatus of claim 11 wherein
    said counter means includes at least one pulse counter operatively associated with each said photomultiplier tube.

13. The measuring apparatus of claim 12 including
    said discriminator means having independent discriminator means operatively associated with each said photomultiplier tube and one said pulse counter.

14. The measuring apparatus of claim 13 including
    amplifier means electrically interposed between each said discriminator and its associated pulse counter.

15. The measuring apparatus of claim 13 including
    signal receiving means operatively associated with said pulse counters for receiving information corresponding to the pulse count therefrom.

16. The measuring apparatus of claim 15 including
    said signal receiving means including computer means.

17. The measuring apparatus of claim 16 including
    visual display means associated with said computer means.

18. The measuring apparatus of claim 17 including data storage means operatively associated with said computer means.

19. The measuring apparatus of claim 17 including said visual display means having means for making a permanent record.

20. The measuring apparatus of claim 18 including said data storage means including magnetic storage means.

21. The measuring apparatus of claim 1 wherein said ruling means includes a Ronchi ruling.

22. The measuring apparatus of claim 21 including said first zone and said second zone being generally parallel and of substantially equal width.

23. The measuring apparatus of claim 1 including said apparatus adapted to receive electromagnetic radiation in the form of light, and telescope means for providing a beam of said light.

24. The measuring apparatus of claim 23 including said ruling disposed generally in the focal plane of said telescope means.

25. The measuring apparatus of claim 2 wherein said lens means include a collimating lens.

26. The measuring apparatus of claim 16 wherein said computer means includes digital computer means.

27. The measuring apparatus of claim 1 including means for converting said electrical pulses into a plot of time versus electromagnetic radiation intensity.

28. The measuring apparatus of claim 23 including platen means having photomultiplier means positioned to receive light from a target object and at least two reference objects.

29. The measuring apparatus of claim 28 including said platen means having said photomultiplier means disposed so as to conform to a star field, whereby the position of one or more target stars with respect to two or more reference stars may be determined.

30. A method of processing electromagnetic radiation comprising
placing a ruling having alternating opaque and light zones in the path of a beam of said radiation,
establishing movement of said ruling through said beam of radiation to cause said opaque zones to interrupt passage of light through said ruling,
permitting a portion of said radiation to pass through said ruling,
transporting a portion of the radiation impinging on said ruling through optical coupling means to at least one radiation conversion station,
converting said radiation at said radiation conversion station into electrical pulses which are related to the intensity of the radiation received at said conversion station,
counting the number of electrical pulses exceeding a predetermined magnitude, and
storing the count of said pulses.

31. The method of claim 30 including moving said ruling in a substantially linear path.

32. The method of claim 31 including after moving said ruling in a linear path, rotating said ruling about an axis generally perpendicular to the upper surface of said ruling, and moving said ruling in a second linear path.

33. The method of claim 31 including moving said ruling sequentially in both directions on said linear path.

34. The method of claim 33 including after reciprocating said ruling in said linear path, rotating said ruling and reciprocating said ruling in a second linear path oriented generally perpendicularly with respect to the first said linear path.

35. The method of claim 32 including moving said ruling in both directions on both said linear paths by alternating between movement of said ruling in one direction on one said linear path and then rotating said ruling to the next said path.

36. The method of claim 30 including transporting the radiation passing through said ruling to said radiation conversion station.

37. The method of claim 30 including providing said electromagnetic radiation in the form of light.

38. The method of claim 37 including providing said light from an object in space.

39. The method of claim 38 including transporting said light passing through said ruling to said conversion station by fiber optic means.

40. The method of claim 38 including passing said light through telescope means before permitting said light to impinge on said ruling.

41. The method of claim 40 including obtaining said light from one or more stars.

42. The method of claim 41 including employing photomultiplier means in converting said light to said electrical pulses.

43. The method of claim 42 including employing discriminator means in converting said light to said electrical pulses.

44. The method of claim 43 including delivering electrical pulses corresponding to the number of light photons impinging on said photomultiplier means to a pulse counter which counts the number of said electrical pulses.

45. The method of claim 44 including periodically transferring said count on said pulse counter to storage means.

46. The method of claim 44 including simultaneously passing light from a number of sources through said ruling, and employing a number of photomultiplier means, discriminator means and pulse counter means to receive separate segments of the light passing through said ruling.

47. The method of claim 46 including delivering a count of said electrical pulses from said pulse counters to electrical signal processing means.

48. The method of claim 47 including making a permanent record of said electrical pulse count.

49. The method of claim 47 creating a plot of time versus electromagnetic radiation intensity based on said count.

50. The method of claim 47 including converting the count received from the pulse counter to a representation of the changes in the intensity of light received by the photomultiplier means within a time period.

51. The method of claim 37 including converting said radiation into said electrical pulses by a self-scanning array of photodiodes.

52. The method of claim 45 including storing said count as digitized signals.

53. The method of claim 46 including amplifying the electrical pulses emitted by said discriminator means prior to introducing said pulses into said pulse counter.

54. The method of claim 30 including employing radiation not passing through said ruling as said radiation transported to said radiation conversion station.

* * * * *